US008687550B2

(12) United States Patent
Xiang et al.

(10) Patent No.: US 8,687,550 B2
(45) Date of Patent: Apr. 1, 2014

(54) METHOD AND SYSTEM FOR CONFIGURING BASE STATION PARAMETERS

(75) Inventors: Yang Xiang, Shenzhen (CN); Huimin Pei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 246 days.

(21) Appl. No.: 12/989,400

(22) PCT Filed: Oct. 10, 2008

(86) PCT No.: PCT/CN2008/072655
§ 371 (c)(1),
(2), (4) Date: Nov. 19, 2010

(87) PCT Pub. No.: WO2009/129676
PCT Pub. Date: Oct. 29, 2009

(65) Prior Publication Data
US 2011/0064068 A1    Mar. 17, 2011

(30) Foreign Application Priority Data
Apr. 25, 2008    (CN) .......................... 2008 1 0066792

(51) Int. Cl.
*H04W 4/00*    (2009.01)
(52) U.S. Cl.
USPC .......................................................... 370/328
(58) Field of Classification Search
USPC .............. 370/310, 310.2, 328, 329, 330, 331, 370/335, 341, 389, 342, 312, 315, 320; 380/247, 255
See application file for complete search history.

(56) References Cited

U.S. PATENT DOCUMENTS

| 5,457,737 A * | 10/1995 | Wen .............................. 455/410 |
| 7,062,272 B2 * | 6/2006 | Grilli et al. ................. 455/435.1 |
| 7,764,673 B1 * | 7/2010 | Asawa et al. ................. 370/389 |

(Continued)

FOREIGN PATENT DOCUMENTS

| CN | 1516388 A | 7/2004 |
| CN | 1599329 A | 3/2005 |
| CN | 1972486 A | 5/2007 |
| WO | 2007009206 A1 | 1/2007 |

OTHER PUBLICATIONS

International Search Report in international application No. PCT/CN2008/072655, mailed on Jan. 22, 2009.

(Continued)

*Primary Examiner* — Anh Ngoc Nguyen
(74) *Attorney, Agent, or Firm* — Oppedahl Patent Law Firm LLC

(57) ABSTRACT

A system for configuring base station parameters comprises a base station, a mobile station and a code generating system. Additionally, a method for configuring base station parameters comprises steps of: after a code generating system generates an operation code, the operation code is sent to a base station via a mobile station, wherein the operation code includes information required for performing a configuration operation; the base station, if determining the operation code as received to be valid, then performs the corresponding configuration operation according to the information required for performing the configuration operation. According to the present invention, without depending on the base station controller and other network elements such as a network management system, the base station can implement message interaction over air link, i.e., parameter configuration may be implemented without requiring the base station to access to the network management system; by using a key and a check code, a parameter configuration process which is triggered inadvertently or maliciously is avoided.

12 Claims, 1 Drawing Sheet

(56) References Cited

U.S. PATENT DOCUMENTS

| | | | |
|---|---|---|---|
| 7,778,638 B2 * | 8/2010 | Shon | 455/433 |
| 7,822,406 B2 * | 10/2010 | Lee et al. | 455/411 |
| 8,127,136 B2 * | 2/2012 | Yun et al. | 713/171 |
| 2004/0136520 A1 * | 7/2004 | Ehreth et al. | 379/399.01 |
| 2007/0008935 A1 * | 1/2007 | Take | 370/335 |
| 2007/0030965 A1 | 2/2007 | Mansz | |

OTHER PUBLICATIONS

English Translation of the Written Opinion of the International Search Authority in international application No. PCT/CN2008/072655, mailed on Jan. 22, 2009.

* cited by examiner

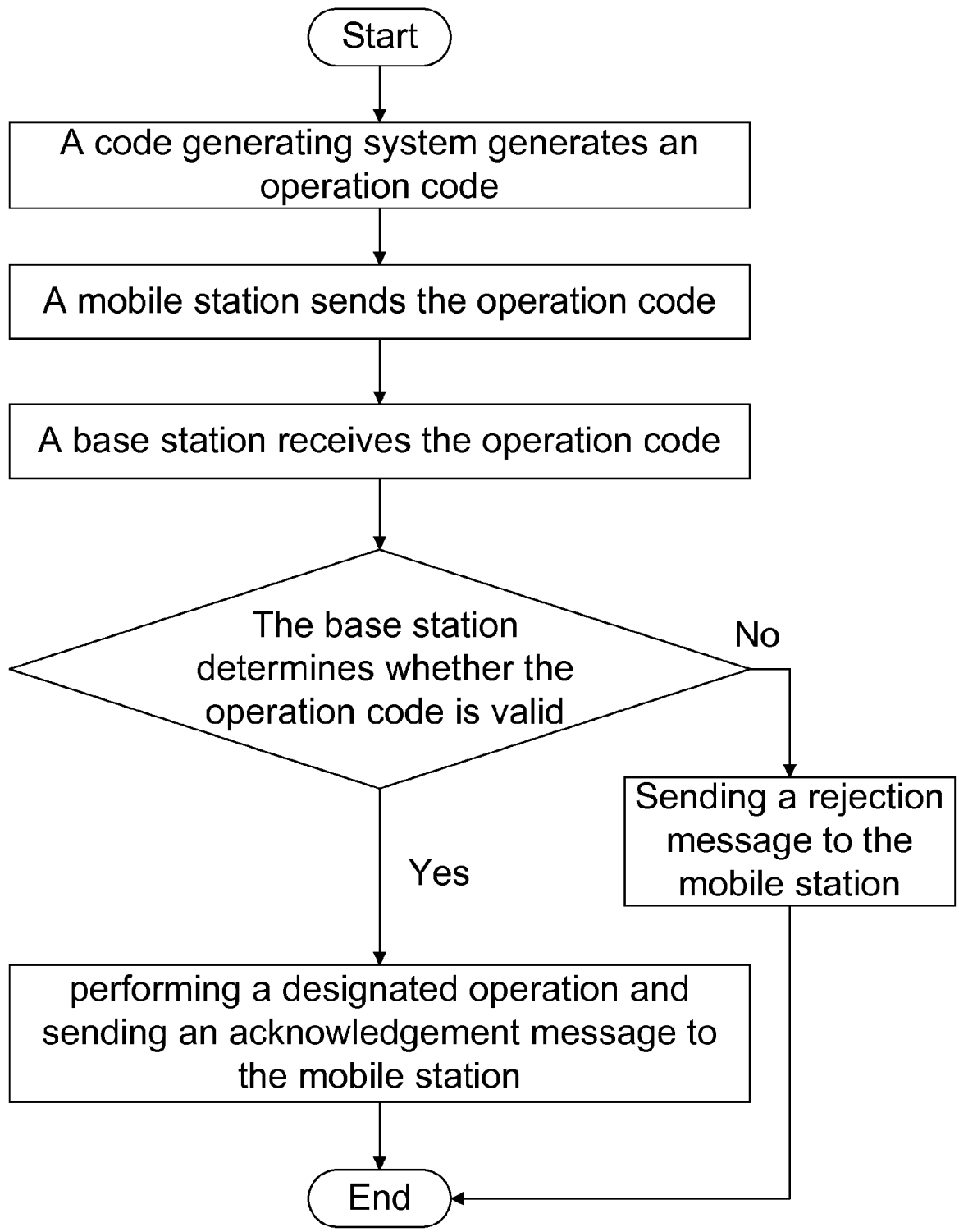

METHOD AND SYSTEM FOR CONFIGURING BASE STATION PARAMETERS

TECHNICAL FIELD

The present invention relates to the field of wireless communications, and in particular relates to a method for configuring base station parameters and a system for configuring base station parameters.

BACKGROUND

In a wireless communication system, some parameters must be configured well before connecting to other network elements and network management system in the network when a base station is accessing a network management system. For example, a base transceiver station (BTS) must firstly complete configuration of information such as IP, IP address mask, next node address for establishing a connection to a network management system via IP. However, this configuration process is typically implemented by connecting a device such as a personal computer or a personal digital assistant (PDA) to a base station. This manner needs an engineer for is maintaining or configuring a base station to additionally carry a personal computer or a PDA, which is inconvenient for commissioning and maintaining of the base station.

SUMMARY

An object of the present invention is to provide a method for configuring base station parameters and a system for configuring base station parameters, which can configure base station parameters without a personal computer or a PDA.

An aspect of the present invention is to provide a method for configuring base station parameters, which comprises the following steps:

after a code generating system generates an operation code, the operation code is sent to a base station via a mobile station, wherein the operation code includes information required for performing a configuration operation; when the base station determines that the received operation code is valid, the base station performs the corresponding configuration operation according to the information required for performing the configuration operation.

The above method may further comprise:

the base station sending a release message and an acknowledgement message to the mobile station when the base station determines that the received operation code is valid.

The above method may further comprise:

the base station sending a release message and a rejection message to the mobile station when the base station determines that the received operation code is invalid.

The above method may further have the following characteristics:

the information required for performing the configuration operation comprises function code and a parameter list, wherein the function code is used for indicating a type of the configuration operation to be performed, and the parameter list comprises parameters required for configuration operations to be performed.

The above method may further have the following characteristics:

the base station and the code generation system store identical keys and use identical encryption algorithms;

the operation code further comprises a check code which is obtained by the code generation system performing calculation with the encryption algorithm based on information required for the configuration operation and a locally stored key; and the base station determining whether the received operation code is valid refers to that: after the base station obtains the check code by performing calculation with a locally stored encryption algorithm based on the required information included in the received operation code for performing the configuration operation and the locally stored key, the base station compares the obtained check code with the check code included in the received operation code, if they are identical, then it is determined that the received operation code is valid, otherwise, it is determined that the received operation code is invalid.

The above method may further have the following characteristics:

the mobile station sends the operation code to the base station by dialing the operation code or sends the operation code to the base station by including the operation code in the message.

The above method may further have the following characteristics:

the code generating system is a network management system.

Another aspect of the present invention is to provide a system for configuring base station parameters, which comprises a base station, a mobile station and a code generating system;

the code generating system is used for generating an operation code;

the mobile station is used for sending the operation code to the base station, wherein the operation code comprises information required for performing configuration operation; and the base station, when determining the received operation code is valid, performs corresponding configuration operation according to the information required for performing the configuration operation.

The above system may further have the following characteristics:

the information required for performing the configuration operation comprises a function code and a parameter list; wherein the function code is used for indicating a type of the configuration operation to be performed, and the parameter list comprises parameters required for configuration operations to be performed.

The above system may further have the following characteristics:

the code generating system is a network management system.

According to the present invention, without depending on other network elements such as a base station controller, a network management system, etc., the base station can implement message interaction over air link, i.e., the parameter configuration may be implemented without requiring the base station to access to the network management system; by using a key and a check code, a parameter configuration process which is triggered inadvertently or maliciously is avoided.

BRIEF DESCRIPTION OF THE DRAWINGS

FIG. 1 is a flow chart of an embodiment of the present invention configuring an IP address for a CDMA (Code Division Multiple Access) 2000 base station.

DETAILED DESCRIPTION

Hereinafter, the technical solution of the present invention will be described in further detail with reference to the drawings and embodiments.

In the present invention, after a code generating system generates an operation code for configuring a base station, the operation code is sent to the base station via the mobile station, and the base station performs corresponding processing as required. Wherein the code generating system need not access to a wireless network where the base station to be configured is located, but the mobile station need access to the wireless network. In other words, the mobile station performs message exchange with the base station after detecting the signal of the to-be-configured base station. After the code generating system generates the operation code, the operation code may be sent to the mobile station manually, and then the mobile station sends the operation code to the base station.

The operation code comprises information required for performing the configuration operation. The information specifically comprises the following elements:

(1) a function code, which indicates a type of the operation to be implemented;

(2) a parameter list, which includes parameters required for a designated operation. Additionally, the operation code may further comprise a check code. The check code is generated by using a encryption algorithm (for example MD5 algorithm) according to the function code, the parameter list and the key. The encryption algorithm resides in the base station and the network management system, i.e., the method of calculating a check code by the base station is identical to that of generating a check code by the code generating system.

Embodiment 1

FIG. 1 shows a flow chart of the present invention applied to a CDMA 2000 system for configuring a base station with IP address configuration as an example. In this embodiment, the network management system is a code generating system. The configuration method specifically comprises the following steps.

Step 101: The network management system generates an operation code for configuring an IP address of a base station. With a function code for configuring an IP address in the operation code as 001 as an example, a parameter list is a 32-bit IP address. Suppose the IP address is configured as 10.51.51.1, the parameter list would be 010051051001.

Step 102: A mobile station dials the operation code as a called number, or sends a control channel short message with an operation code as content to the base station.

Step 103: After demodulating the access channel or receiving the operation code, the base station decodes the operation code.

Step 104: The base station calculates a check code based on a stored key, the function code obtained by decoding, and the parameter list, where the stored key is identical to the key used by the network management system when generating the operation code; and then the base station determines whether the decoded check code is identical to the calculated check code, if yes, the operation code as inputted at this time is valid; otherwise the operation code as inputted at this time is invalid.

Step 105: If the operation code as inputted at this time is invalid, the base station sends a release message to the mobile station over a forward traffic channel and sends a rejection message to the mobile station over a paging channel to prompt that the operation code as inputted at this time is invalid; and if the operation code as inputted at this time is valid, the base station implements a designated configuration operation, sends a release message to the mobile station over a forward traffic channel, and sends an acknowledgement message to the mobile station over a paging channel to prompt that the input is valid.

Embodiment 2

In this embodiment, the present invention is illustrated with resetting a single board of a BTS or the whole BTS in the CDMA 2000 system as an example. In this embodiment, the network management system is a code generating system. The configuration method specifically comprises the following steps.

Step 201: The network management system generates an operation code for resetting a BTS. With an example that the function code to reset in the operation code is 002, the parameter list is a corresponding module or the whole BTS required to be reset. Suppose the whole BTS needs to be reset, and 00 is used to express that the reset object is the whole BTS, the parameter list would be 00.

Subsequent steps are completely identical to steps 102-105 for configuring the IP address, which will not be detailed here.

The implementation of each network element in the system for configuring base station parameters is identical to the above configuration method, which will not be detailed here. The method and system according to the present invention may be further applied to a base station of a system such as GSM (global systems for mobile communications), WCDMA (wideband code division multiple access), Winmax (World interoperability for microwave access), etc. The flow involved in the method may vary with different system call flows and channel names, however, the core idea of the present invention is to implement parameter configuration through air interface signaling simply transacting between the network and mobile station, not to focus on the depiction on different flows under different systems, which thus will not be enumerated one by one.

INDUSTRIAL APPLICABILITY

According to the present invention, without depending on other network elements such as a base station controller, a network management system, etc., the base station can implement message interaction over air link, i.e., parameter configuration may be implemented without requiring the base station to access to the network management system; by using a key and a check code, a parameter configuration process which is triggered inadvertently or maliciously is avoided.

What is claimed is:

1. A method for configuring base station parameters, comprising:

generating an operation code by a code generating system, the operation code being sent to a base station via a mobile station, wherein the operation code includes information required for configuring the base station comprising the IP address of a network management system; when the base station determines that the received operation code is valid, the base station performing the corresponding configuration operation according to the information required for performing the configuration operation so that the base station can communicate with other network elements comprising the network management system in a network.

2. The method according to claim 1, further comprising:
the base station sending a release message and an acknowledgement message to the mobile station when the base station determines that the received operation code is valid.

3. The method according to claim 1, further comprising:
the base station sending a release message and a rejection message to the mobile station when the base station determines that the received operation code is invalid.

4. The method according to claim 1, wherein
the information required for performing the configuration operation comprises a function code and a parameter list, wherein the function code is used for indicating a type of the configuration operation to be performed, and the parameter list comprises parameters required for configuration operations to be performed.

5. The method according to claim 1, wherein
the base station and the code generation system store identical keys and use identical encryption algorithms;
the operation code further comprises a check code which is obtained by the code generation system performing calculation with the encryption algorithm based on information required for the configuration operation and a locally stored key; and
the base station determining whether the received operation code is valid refers to that: after the base station obtains the check code by performing calculation with a locally stored encryption algorithm based on the required information included in the received operation code for performing the configuration operation and the locally stored key, the base station compares the obtained check code with the check code included in the received operation code, if they are identical, then it is determined that the received operation code is valid, otherwise, it is determined that the received operation code is invalid.

6. The method according to claim 1, wherein
the mobile station sends the operation code to the base station by dialing the operation code or sends the operation code to the base station by including the operation code in the message.

7. The method according to claim 1, wherein
the code generating system is the network management system.

8. A system for configuring base station parameters, comprising a base station;
the system further comprising a mobile station and a code generating system;
the code generating system being used for generating an operation code;
the mobile station being used for sending the operation code to the base station, wherein the operation code comprises information required for configuring the base station comprising the IP address of a network management system; and
the base station, when determining the received operation code is valid, performing corresponding configuration operation according to the information required for performing the configuration operation so that the base station can communicate with other network elements comprising the network management system in a network.

9. The system according to claim 8, wherein
the information required for performing the configuration operation comprises a function code and a parameter list; wherein the function code is used for indicating a type of the configuration operation to be performed, and the parameter list comprises parameters required for configuration operations to be performed.

10. The system according to claim 8, wherein the code generating system is the network management system.

11. The method according to claim 2, wherein
the base station and the code generation system store identical keys and use identical encryption algorithms;
the operation code further comprises a check code which is obtained by the code generation system performing calculation with the encryption algorithm based on information required for the configuration operation and a locally stored key; and
the base station determining whether the received operation code is valid refers to that: after the base station obtains the check code by performing calculation with a locally stored encryption algorithm based on the required information included in the received operation code for performing the configuration operation and the locally stored key, the base station compares the obtained check code with the check code included in the received operation code, if they are identical, then it is determined that the received operation code is valid, otherwise, it is determined that the received operation code is invalid.

12. The method according to claim 3, wherein
the base station and the code generation system store identical keys and use identical encryption algorithms;
the operation code further comprises a check code which is obtained by the code generation system performing calculation with the encryption algorithm based on information required for the configuration operation and a locally stored key; and
the base station determining whether the received operation code is valid refers to that: after the base station obtains the check code by performing calculation with a locally stored encryption algorithm based on the required information included in the received operation code for performing the configuration operation and the locally stored key, the base station compares the obtained check code with the check code included in the received operation code, if they are identical, then it is determined that the received operation code is valid, otherwise, it is determined that the received operation code is invalid.

* * * * *

UNITED STATES PATENT AND TRADEMARK OFFICE
CERTIFICATE OF CORRECTION

PATENT NO. : 8,687,550 B2
APPLICATION NO. : 12/989400
DATED : April 1, 2014
INVENTOR(S) : Xiang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 271 days.

Signed and Sealed this
Twenty-ninth Day of September, 2015

Michelle K. Lee
*Director of the United States Patent and Trademark Office*